(12) United States Patent
Krupetsky et al.

(10) Patent No.: US 6,555,025 B1
(45) Date of Patent: Apr. 29, 2003

(54) TUNED SEALING MATERIAL FOR SEALING OF A FLAT PANEL DISPLAY

(75) Inventors: Dmitriy Krupetsky, San Francisco, CA (US); Anthony P. Schmid, Solana Beach, CA (US); Paul N. Ludwig, Livermore, CA (US)

(73) Assignee: Candescent Technologies Corporation, San Jose, CA (US)

( * ) Notice: Subject to any disclaimer, the term of this patent is extended or adjusted under 35 U.S.C. 154(b) by 0 days.

(21) Appl. No.: 09/495,404

(22) Filed: Jan. 31, 2000

(51) Int. Cl.$^7$ .................................................. H01B 1/22
(52) U.S. Cl. .................. 252/512; 252/518.1; 252/521.2
(58) Field of Search ................................. 252/500, 512, 252/518.1, 521.2; 250/515.1

(56) References Cited

U.S. PATENT DOCUMENTS

| | | | |
|---|---|---|---|
| 3,966,447 A | 6/1976 | Asahara et al. ................. 65/40 |
| 4,238,704 A | 12/1980 | Bonk et al. .................. 313/113 |
| 4,441,051 A | 4/1984 | Thomas ....................... 313/579 |
| 4,997,796 A | 3/1991 | Toyoshima et al. ............ 501/75 |
| 5,366,664 A | * 11/1994 | Varadan et al. .............. 252/512 |
| 5,541,473 A | 7/1996 | Duboc et al. ................ 313/422 |
| 5,545,474 A | * 8/1996 | Podlaseck et al. ........... 428/288 |
| 5,820,435 A | 10/1998 | Cooper et al. ................ 445/25 |
| 5,958,303 A | * 9/1999 | Narkis et al. ................ 252/511 |

OTHER PUBLICATIONS

Database WPI Section Ch, Week 199723, Derwent Publications Ltd., London, GB; Class L01, AN 1997–255254 XP002169518 & JP 09 086959 A (TOTO Ltd), Mar. 31, 1997 abstract.

* cited by examiner

*Primary Examiner*—Mark Kopec
(74) *Attorney, Agent, or Firm*—Wagner, Murabito, Hao LLP (57) ABSTRACT

A tuned sealing material and a method for attaching a first surface to a second surface using the tuned sealing material are disclosed. In one embodiment, the present invention applies a tuned sealing material between a first surface and a second surface. In this embodiment, the tuned sealing material is comprised of a combination of a filler material and a glass material. Furthermore, in this embodiment, the filler material is tuned to absorb electromagnetic radiation of a selected frequency. Next, in the present embodiment, the tuned sealing material is subjected to the electromagnetic radiation of the selected frequency. As a result of tuning the filler material, the tuned sealing material absorbs the electromagnetic radiation of the selected frequency. After absorbing the electromagnetic radiation of the desired frequency, the tuned sealing material is used to attach the first surface and the second surface.

12 Claims, 8 Drawing Sheets

TUNED SEALING MATERIAL FOR SEALING OF A FLAT PANEL DISPLAY

TECHNICAL FIELD

The present claimed invention relates to the field of flat panel displays. More specifically, the present claimed invention relates to a flat panel display and methods for forming a flat panel display having a seal formed using seal material.

BACKGROUND ART

A Cathode Ray Tube (CRT) display generally provides the best brightness, highest contrast, best color quality and largest viewing angle of prior art displays. CRT displays typically use a layer of phosphor that is deposited on a thin glass faceplate. These CRTs generate a picture by using one to three electron beams that generate electrons that are scanned across the phosphor in a raster pattern. The phosphor converts the electron energy into visible light so as to form the desired picture. However, prior art CRT displays are large and bulky due to the large vacuum tubes that enclose the cathode and extend from the cathode to the faceplate of the display. Therefore, typically, other types of display technologies such as active matrix liquid crystal display, plasma display and electroluminiscent display technologies have been used in the past to form thin displays.

Recently, a thin flat panel display has been developed that uses the same process for generating pictures as is used in CRT devices. These thin flat panel displays use a backplate including a matrix structure of rows and columns of electrodes. One such flat panel display is described in U.S. Pat. No. 5,541,473 titled GRID ADDRESSED FIELD EMISSION CATHODE that is incorporated herein by reference as background material. Typically, the backplate is formed by depositing a cathode structure (electron emitting) on a glass plate. The cathode structure includes emitters that generate electrons. The backplate typically has an active area within which the cathode structure is deposited. Typically, the active area does not cover the entire surface of the glass plate, leaving a thin strip that extends around the glass plate. Electrically conductive traces extend through the thin strip to allow for connectivity to the active area.

Prior art flat panel displays include a thin glass faceplate having one or more layers of phosphor deposited over the interior surface thereof. The faceplate is typically separated from the backplate by about 0.1 to 2 millimeters. The faceplate includes an active area within which the layer (or layers) of phosphor is deposited. A thin strip that does not contain phosphor extends from the active area to the edges of the glass plate. The faceplate is attached to the backplate using a glass seal.

In one prior art approach, sealing material disposed between the faceplate and the backplate is heated using a laser beam. The laser beam is intended to melt the sealing material and thereby provide a seal between faceplate and the backplate. Unfortunately, conventional methods for sealing the faceplate and the backplate together often require the use of a high power laser beam or require exposing the sealing material to the laser beam for an extended period of time. As a result, extremely high temperatures are often generated. Exposing the flat panel display to such high temperatures can deleteriously affect the flat panel display. For example, exposing the flat panel display to such high temperatures can cause unwanted outgassing of contaminants, damage to the glass of the faceplate and/or the backplate, and various other problems.

Thus, a need exists for a method and apparatus for sealing a faceplate to a backplate wherein the method and apparatus does not require subjecting the sealing material to a laser beam for an extended period of time. A further need exists for a method and apparatus for sealing a faceplate to a backplate wherein the method and apparatus does not require subjecting the sealing material to a high power laser beam. Yet another need exists for a method and apparatus for sealing a faceplate to a backplate wherein the method and apparatus reduces the amount of heating of the faceplate and backplate.

DISCLOSURE OF THE INVENTION

The present invention provides a method and apparatus for sealing a faceplate to a backplate wherein the method and apparatus does not require subjecting the sealing material to a laser beam for an extended period of time. The present invention further provides a method and apparatus for sealing a faceplate to a backplate wherein the method and apparatus does not require subjecting the sealing material to a high power laser beam. The present invention also provides a method and apparatus for sealing a faceplate to a backplate wherein the method and apparatus reduces the amount of heating of the faceplate and backplate.

In one embodiment of the present invention, the present invention applies a tuned sealing material between a first surface and a second surface. In this embodiment, the tuned sealing material is comprised of a combination of a filler material and a glass material. Furthermore, in this embodiment, the filler material is tuned to absorb electromagnetic radiation of a selected frequency. Next, in the present embodiment, the tuned sealing material is subjected to the electromagnetic radiation of the selected frequency. As a result of tuning the filler material, the tuned sealing material absorbs the electromagnetic radiation of the selected frequency. After absorbing the electromagnetic radiation of the desired frequency, the tuned sealing material is used to attach the first surface and the second surface.

In another embodiment, the present invention includes the features of the above-described embodiment and further recites that the first surface is subjected to electromagnetic radiation of a second selected frequency. In this embodiment, the first surface absorbs the electromagnetic radiation of the second selected frequency and thereby assists the attaching of the first and second surfaces.

In yet another embodiment, the present invention includes the features of the first above-described embodiment, and further applies a thin film to the first surface. In this embodiment, the thin film is adapted to absorb electromagnetic radiation of a second selected frequency. In this embodiment, the first surface absorbs the electromagnetic radiation of the second selected frequency and thereby assists the attaching of the first and second surfaces.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
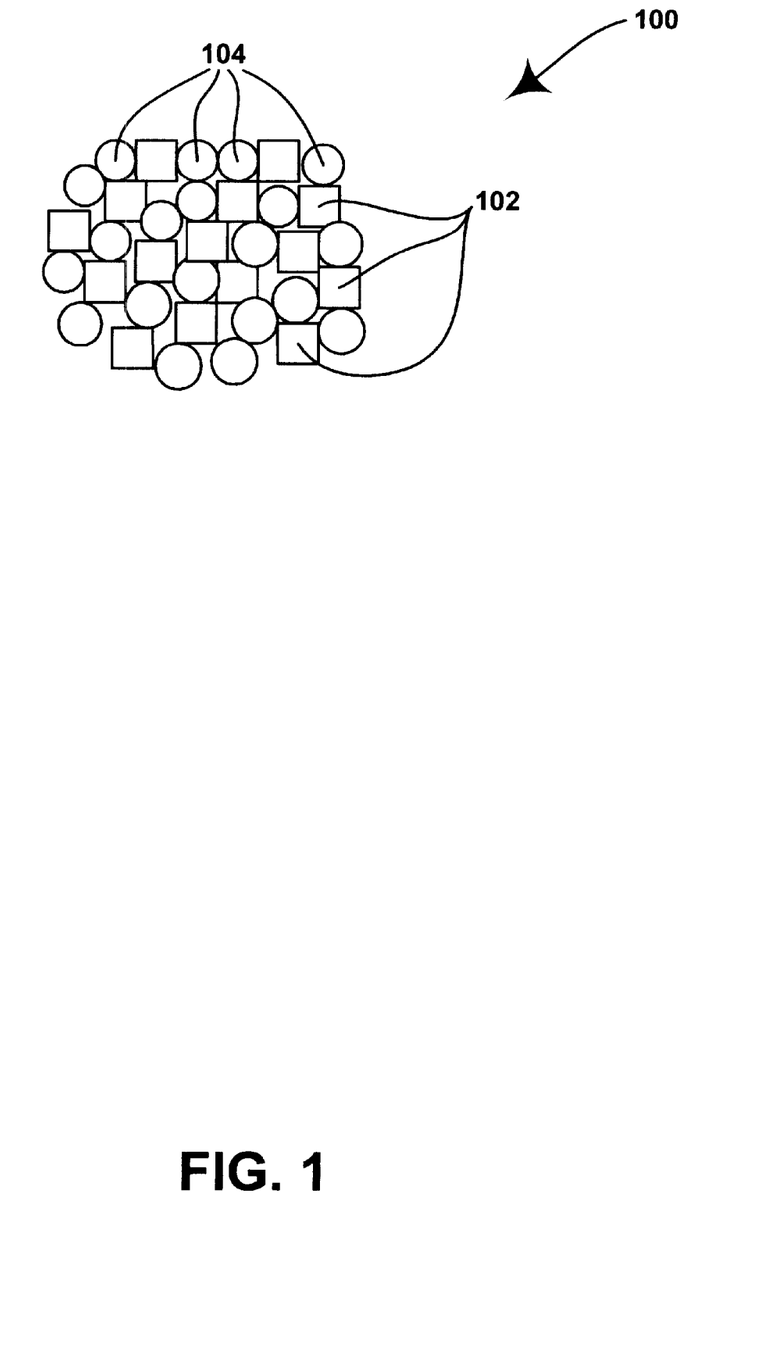
FIG. 1 is a side sectional view of a portion of tuned sealing material in accordance with one embodiment of the present claimed invention.

With reference now to FIG. 1, a side sectional view of a portion of tuned sealing material 100 is shown in accordance with one embodiment of the present invention. For purposes of the present Application, tuned sealing material 100 will be described in conjunction with being used to attach a faceplate of a flat panel display to a backplate of a flat panel display. Although such an embodiment is described herein, tuned sealing material 100 of the present invention is also well suited to sealing any of various first surfaces to any of various second surfaces.

Referring still to FIG. 1, in the present embodiment, tuned sealing material 100 is comprised of a filler material, typically shown as squares 102, and a glass material, typically shown as circles 104. Although filler material 102 is represented by squares and glass material 104 is represented by circles in FIG. 1, it will be understood that such a representation is merely for purposes of illustration and clarity. Glass material 104 and filler material 102 are adapted to be mixed together to form a glass frit. In the present invention, at least one component (either filler material 102 or glass material 104) of tuned sealing material 100 is tuned to absorb electromagnetic radiation of a selected frequency. Furthermore, the present invention is also well suited to an embodiment in which both components (i.e. filler material 102 and glass material 104) of tuned sealing material 100 are tuned to absorb electromagnetic radiation of a selected frequency. In so doing, in an embodiment in which light (e.g. laser light) is used to heat and melt tuned sealing material 100, the tuned component of tuned sealing material 100 will readily absorb the electromagnetic radiation of the selected frequency. Thus, in such an embodiment, the tuned component will expedite the heating and subsequent melting of tuned sealing material 100. As a result, the present embodiment reduces the amount of time during which the sealing material must be subjected to the laser beam. Furthermore, because the tuned component of tuned sealing material 100 will readily absorb the electromagnetic radiation of the selected frequency (e.g. the laser light), in the present embodiment, tuned sealing material 100 can be melted without requiring the use of a high power laser beam. Also, by providing for the rapid melting of tuned sealing material 100, using a laser source of lower power than is necessary for conventional processes, the present embodiment reduces unwanted heating of the faceplate and backplate of the flat panel display.

Figure 2:
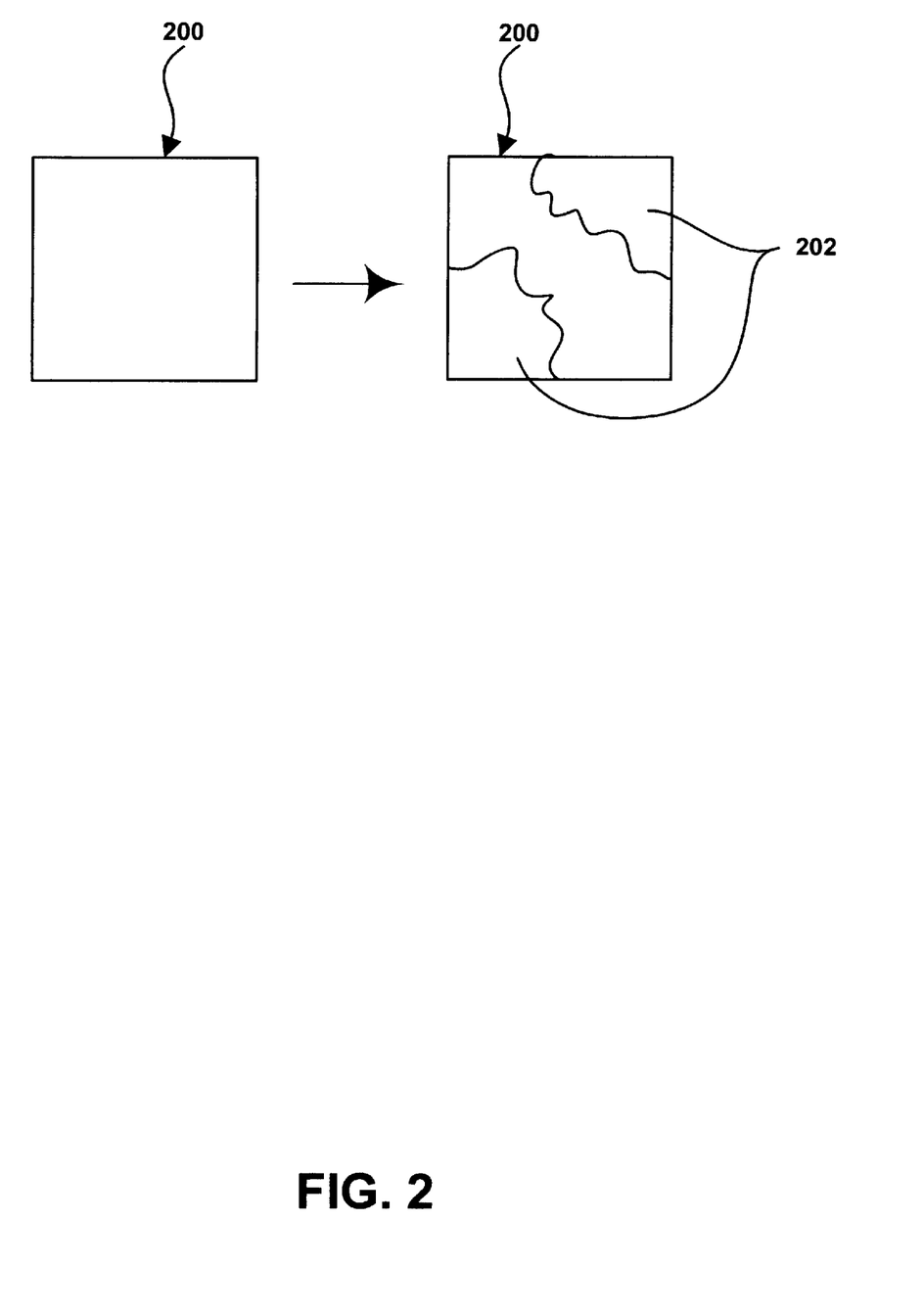
FIG. 2 is a side sectional view of a single molecule of filler material (shown as a square) which is stained to absorb electromagnetic radiation of a selected frequency in accordance with one embodiment of the present claimed invention.

With reference now to FIG. 2, a side sectional view of a single molecule of filler material (shown as square 200) is shown. In the present embodiment, molecule 200 of filler material is tuned to absorb electromagnetic radiation of a selected frequency by staining molecule 200 of filler material. More particularly, in the present embodiment, molecule 200 of filler material has stained regions 202 which were stained with an electromagnetic radiation absorbing material. That is, the material used to stain molecule 200 of filler material is a material which will absorb electromagnetic radiation of a selected frequency. For example, in one embodiment, the material used to stain molecule 200 of filler material is intended to absorb light from a gallium arsenide laser (i.e. electromagnetic radiation having a frequency of approximately 810 nanometers). In such an embodiment, molecule 200 of filler material is stained with a chrome oxide material. Although such a stain is recited in the present embodiment, the present invention is also well suited to an embodiment in which the material used to stain molecule 200 of filler material is selected from the group consisting of copper oxides, ferrous oxides, chrome oxides, and ferrous chromates. Although such staining materials are recited in the present embodiment, the present invention is also well suited to an embodiment in which various other staining materials are used to enhance the absorption of the electromagnetic radiation of the selected frequency. Additionally, although laser light of such a frequency is recited in the present embodiment, the present invention is also well suited to tuning molecule 200 of filler material to absorb laser light of various other wavelengths, to absorb visible light, to absorb microwave radiation, to absorb infrared radiation, and the like.

Referring still to FIG. 2, one of the above embodiments recites staining molecule 200 of filler material with a material which will absorb laser light and thereby expedite the heating and subsequent melting of tuned sealing material 100. The present invention is, however, also well suited to an embodiment in which molecule 200 is stained with a material which, for example, expedites the curing of tuned sealing material 100. For example, the present invention is well suited to an embodiment in which the stain absorbs ultraviolet light which, in turn, cures tuned sealing material 100. Thus, the present invention is not limited solely to tuning a component (or components) thereof to expedite heating and/or melting of the tuned sealing material.

With reference again to FIG. 2, although a single molecule of filler material 200 is discussed above, the present invention is also well suited to an embodiment in which the tuned sealing material is comprised of a plurality of filler materials. Additionally, the present invention is also well suited to an embodiment in which more than one of the plurality of filler materials is stained to absorb one or more than one respective selected frequencies of the electromagnetic radiation.

Figure 3:
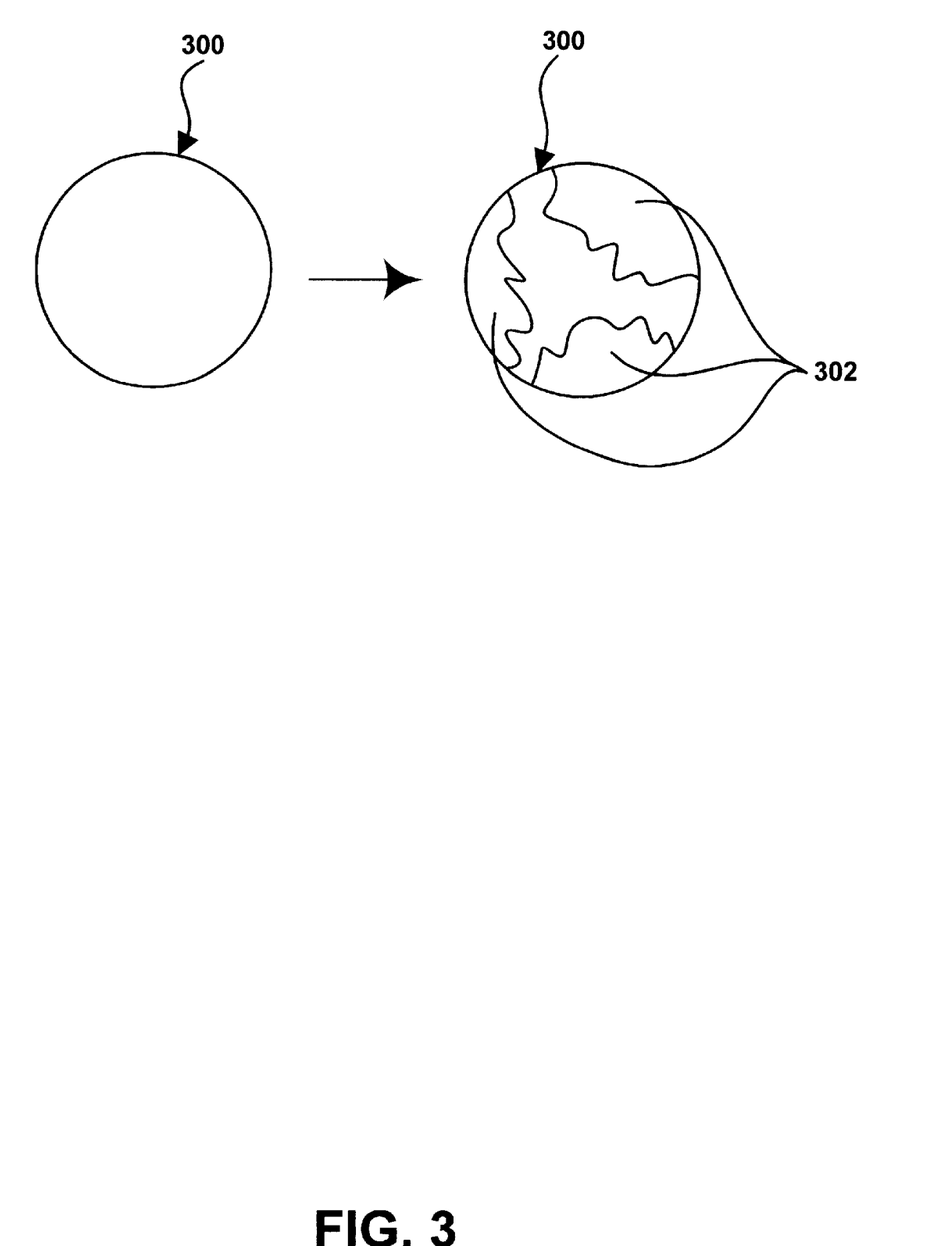
FIG. 3 is a side sectional view of a single molecule of glass material (shown as a circle) which is stained to absorb electromagnetic radiation of a selected frequency in accordance with one embodiment of the present claimed invention.

With reference now to FIG. 3, a side sectional view of a single molecule of glass material (shown as circle 300) is shown. In the present embodiment, molecule 300 of glass material is tuned to absorb electromagnetic radiation of a selected frequency by staining molecule 300 of glass material. More particularly, in the present embodiment, molecule 300 of glass material has stained regions 302 which were stained with an electromagnetic radiation absorbing material. That is, the material used to stain molecule 300 of glass material is a material which will absorb electromagnetic radiation of a selected frequency. For example, in one embodiment, the material used to stain molecule 300 of glass material is intended to absorb light from a gallium arsenide laser (i.e. electromagnetic radiation having a frequency of approximately 810 nanometers). In such an embodiment, molecule 300 of glass material is stained with a chrome oxide material. Although such a stain is recited in the present embodiment, the present invention is also well suited to an embodiment in which the material used to stain molecule 300 of glass material is selected from the group consisting of copper oxides, ferrous oxides, chrome oxides, and ferrous chromates. Although such staining materials are recited in the present embodiment, the present invention is also well suited to an embodiment in which various other staining materials are used to enhance the absorption of the electromagnetic radiation of the selected frequency. Additionally, although laser light of such a frequency is recited in the present embodiment, the present invention is also well suited to tuning molecule 300 of glass material to absorb laser light of various other wavelengths, to absorb visible light, to absorb microwave radiation, to absorb infrared radiation, and the like.

Referring still to FIG. 3, one of the above embodiments recites staining molecule 300 of glass material with a material which will absorb laser light and thereby expedite the heating and subsequent melting of tuned sealing material 100. The is present invention is, however, also well suited to an embodiment in which molecule 300 is stained with a material which, for example, expedites the curing of tuned sealing material 100. For example, the present invention is well suited to an embodiment in which the stain absorbs ultraviolet light which, in turn, cures tuned sealing material 100. Thus, the present invention is not limited solely to tuning a component (or components) thereof to expedite heating and/or melting of the tuned sealing material.

With reference again to FIG. 3, although a single molecule of glass material 300 is discussed above, the present invention is also well suited to an embodiment in which the tuned sealing material is comprised of a plurality of glass materials. Additionally, the present invention is also well suited to an embodiment in which more than one of the plurality of glass materials is stained to absorb one or more than one respective selected frequencies of the electromagnetic radiation.

Figure 4:
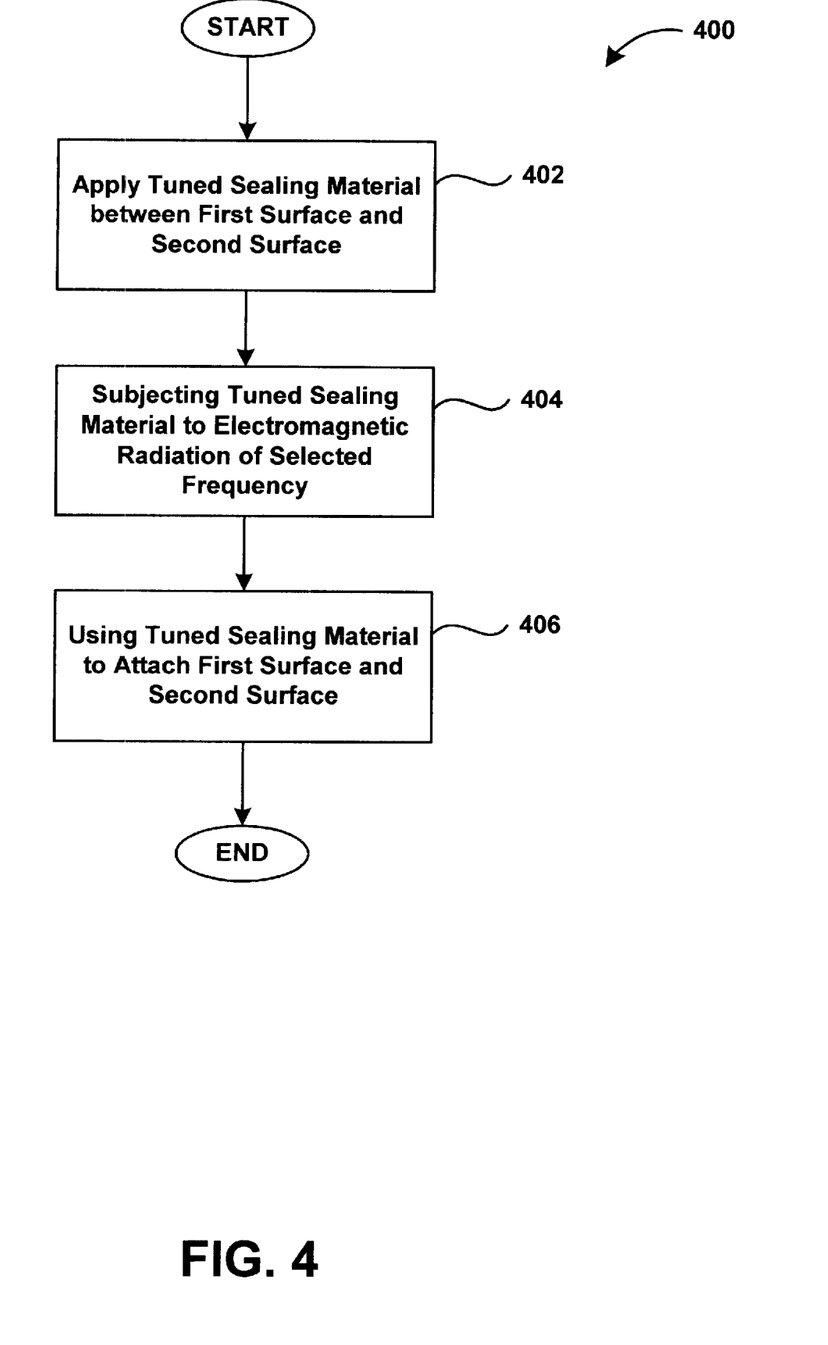
FIG. 4 is a flow chart of steps performed in accordance with one embodiment of the present claimed invention.

With reference now to FIG. 4, a flow chart 400 of steps performed in accordance with one embodiment of the present invention is shown. The various steps of flow chart 400 will be described below in conjunction with the embodiments of FIGS. 5–8. In using tuned sealing material 100 of FIG. 1 to attach a backplate to a faceplate, the present embodiment first performs step 402 of flow chart 400. That is, the present embodiment applies tuned sealing material 100 between a first surface and a second surface. Once again, for purposes of the present Application, tuned sealing material 100 will be described in conjunction with being used to attach a faceplate of a flat panel display to a backplate of a flat panel display. However, tuned sealing material 100 of the present invention is also well suited to sealing any of various first surfaces to any of various second surfaces.

With reference still to step 402 of FIG. 4, in the present embodiment tuned sealing material 100 is comprised of a mixture of filler material 102 and a glass material 104, all of FIG. 1. Additionally, in the present embodiment, at least one component (i.e. filler material 102 or glass material 104) of tuned sealing material 100 is tuned to absorb electromagnetic radiation of a selected frequency.

Figure 5:
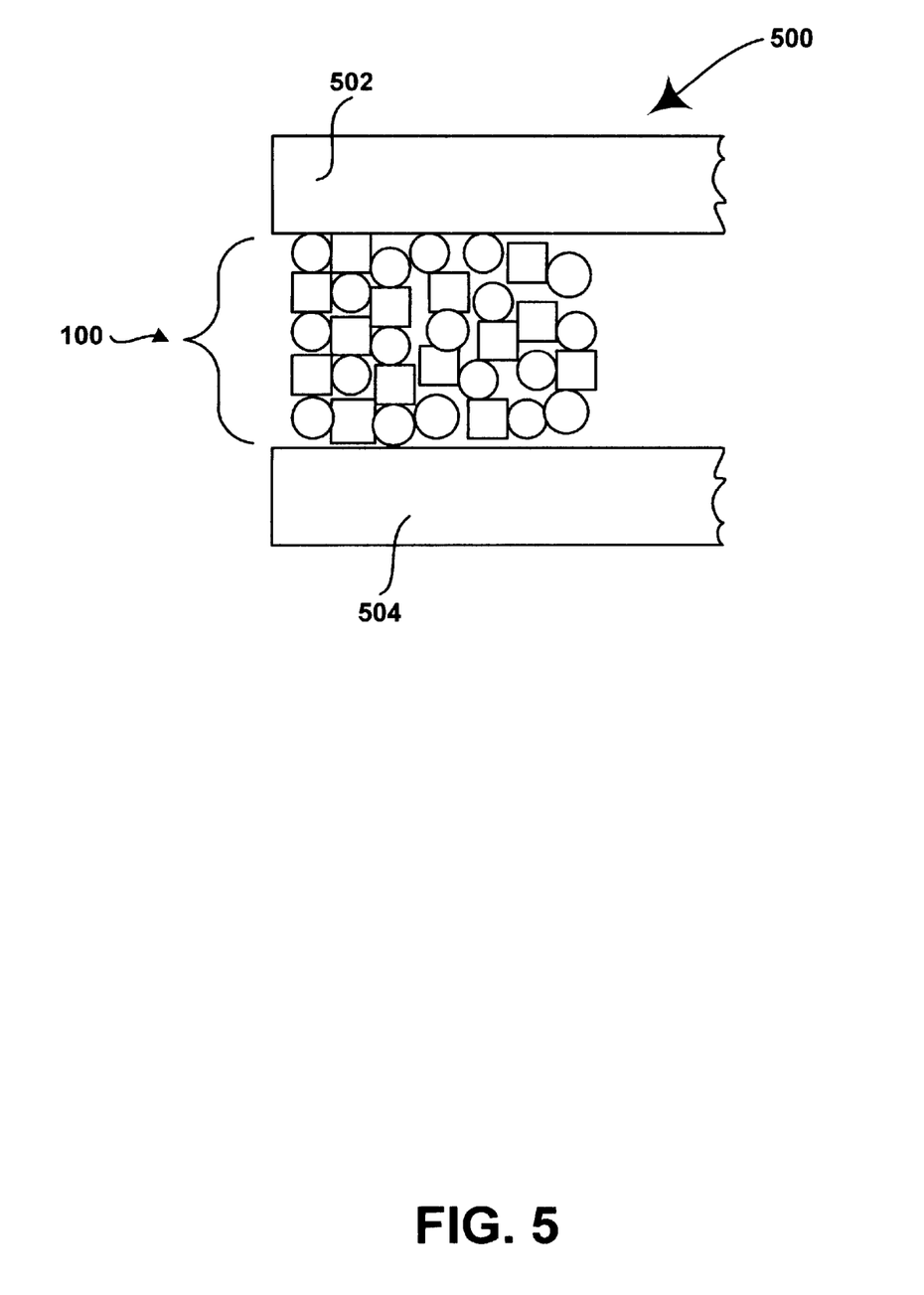
FIG. 5 is a side sectional view of a backplate and a faceplate having tuned sealing material disposed therebetween in accordance with one embodiment of the present claimed invention.

Referring now to FIG. 5, a side sectional view illustrating the structure obtained after performing step 402 of FIG. 4 is shown. FIG. 5 depicts a portion of a flat panel display device 500. In FIG. 5, a backplate 502 and a faceplate 504 have tuned sealing material 100 disposed therebetween in accordance with one embodiment of the present claimed invention.

With reference again to FIG. 4, after the completion of step 402, the present embodiment proceeds to step 404. At step 404, the present embodiment subjects tuned sealing material 100 to electromagnetic radiation of a selected frequency. In so doing, the at least one tuned component (e.g. filler material 102 and/or glass material 104) of tuned sealing material 100 absorbs the electromagnetic radiation of the selected frequency. In so doing, in an embodiment in which light (e.g. laser light) is used to heat and melt tuned sealing material 100, the tuned component of tuned sealing material 100 will readily absorb the electromagnetic radiation of the selected frequency. Thus, in such an embodiment, the tuned component will expedite the heating and subsequent melting of tuned sealing material 100.

At step 406, the present embodiment uses tuned sealing material 100 which has been subjected to the electromagnetic radiation of the selected frequency to attach backplate 502 and faceplate 504. In the present embodiment, after being subjected to the electromagnetic radiation of the selected frequency, tuned sealing material 100 will be melted and will, thus, provide a seal between backplate 502 and faceplate 504.

Figure 6:
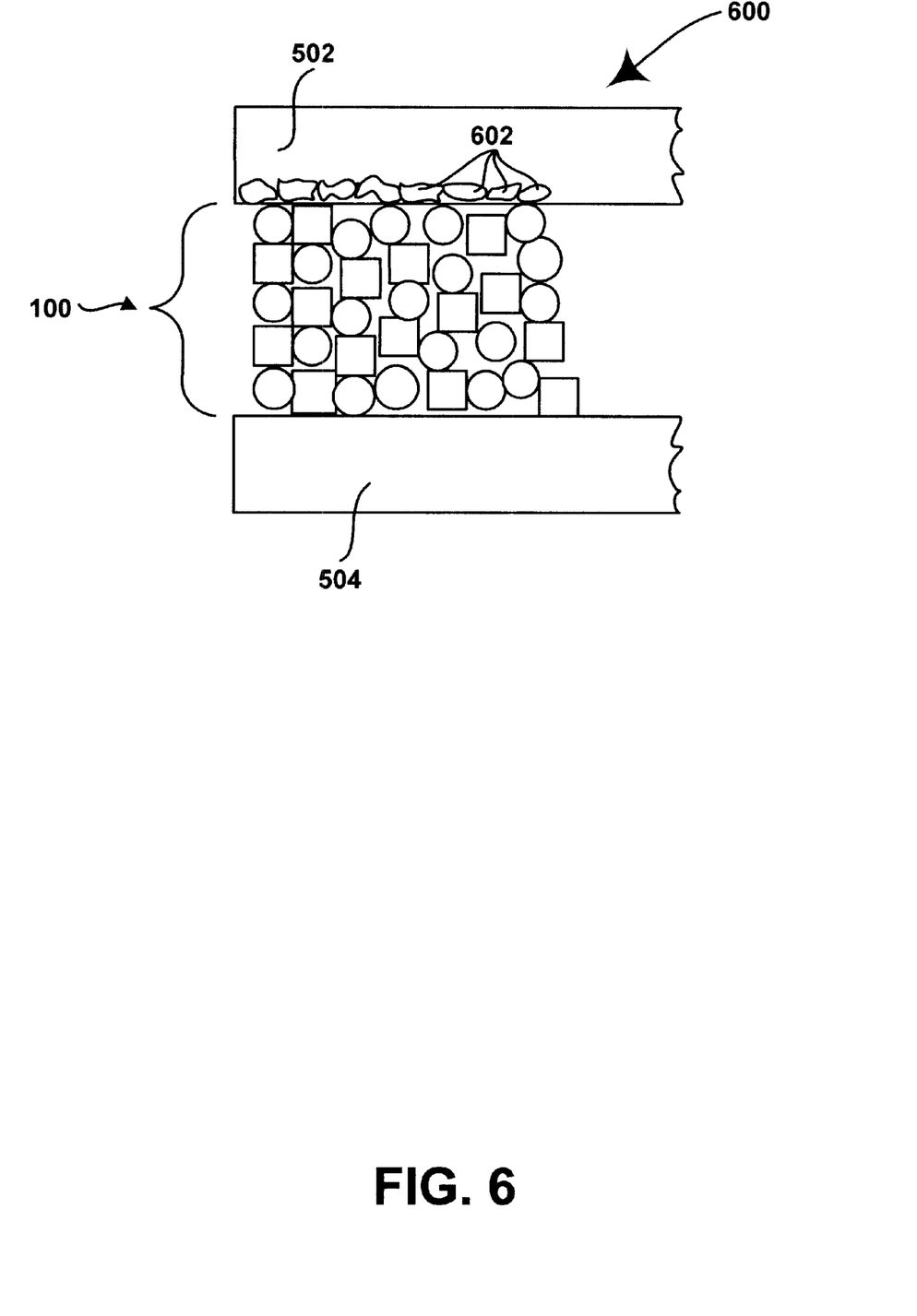
FIG. 6 is a side sectional view of a stained backplate and a faceplate having tuned sealing material disposed therebetween in accordance with one embodiment of the present claimed invention.

With reference now to FIG. 6, another embodiment 600 of the present invention is shown. In this embodiment, backplate 502 is stained with material to provide stained regions, typically shown as 602. In the present embodiment, stained regions 602 are stained with an electromagnetic radiation absorbing material. That is, the material used to stain backplate 502 is a material which will absorb electromagnetic radiation of a selected frequency. In a manner similar to that described above for stained components of tuned sealing material 100, backplate 502 will now more readily absorb selected electromagnetic radiation. In so doing, the present embodiment further expedites, for example, the heating and subsequent melting of the sealing material by providing a heated surface (i.e. the surface of stained backplate 502) which is thermally coupled to tuned sealing material 100. Furthermore, in one embodiment, the material used to stain backplate 502 is chosen so that it will enhance the absorption of electromagnetic radiation having a frequency different from the frequency of the electromagnetic radiation which will be readily absorbed by tuned sealing material 100. In such an embodiment, two separate electromagnetic radiation sources can be used to selectively, for example, heat either the sealing material or the backplate 502.

Figure 7:
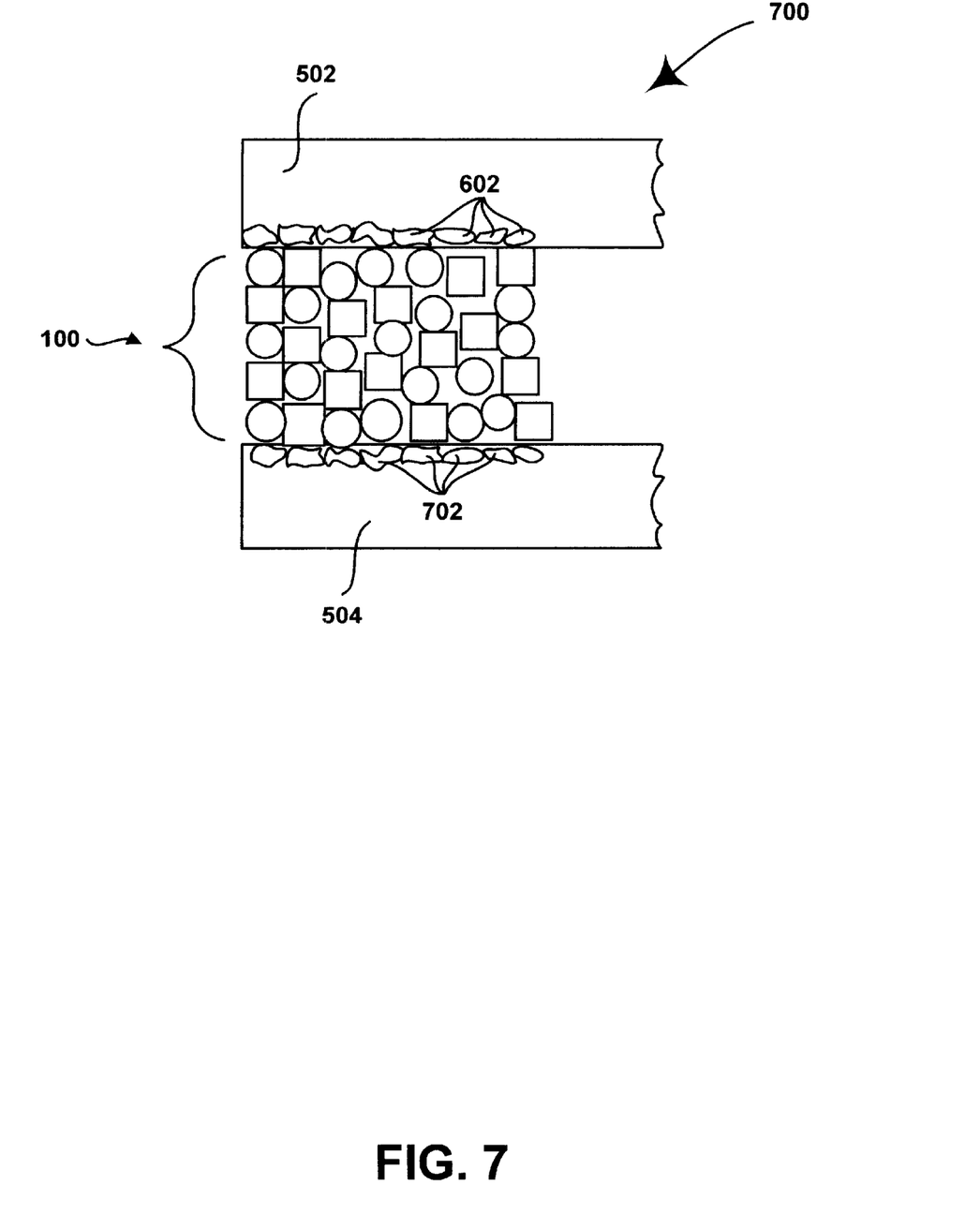
FIG. 7 is a side sectional view of a stained backplate and a stained faceplate having tuned sealing material disposed therebetween in accordance with one embodiment of the present claimed invention.

With reference now to FIG. 7, another embodiment 700 of the present invention is shown. In this embodiment, backplate 502 is stained with material to provide stained regions, typically shown as 602, and faceplate 504 is stained with material to provide stained regions, typically shown as 702. In the present embodiment, stained regions 602 and 702 are stained with an electromagnetic radiation absorbing material. That is, the material used to stain backplate 502 and faceplate 504 is a material which will absorb electromagnetic radiation of a selected frequency. In a manner similar to that described above for stained components of tuned sealing material 100, backplate 502 and faceplate 504 will now more readily absorb selected electromagnetic radiation. In so doing, the present embodiment further expedites, for example, the heating and subsequent melting of the sealing material by providing heated surfaces (i.e. the surface of stained backplate 502 and the surface of stained faceplate 504) which are thermally coupled to tuned sealing material 100.

With reference still to FIG. 7, in one embodiment, the material used to stain backplate 502 and faceplate 504 is chosen so that it will enhance the absorption of electromagnetic radiation having a frequency different from the frequency of the electromagnetic radiation which will be readily absorbed by tuned sealing material 100. In such an embodiment, two separate electromagnetic radiation sources can be used to selectively, for example, heat either tuned sealing material 100 or backplate 502 and faceplate 504. In yet another embodiment, the material used to stain backplate 502 is chosen so that it will enhance the absorption of electromagnetic radiation having a frequency different from the frequency of the electromagnetic radiation which will be readily absorbed by faceplate 504. Additionally, the material used to stain backplate 502 and the material used to stain faceplate 504 is chosen so that it will enhance the absorption of electromagnetic radiation having a frequency different from the frequency of the electromagnetic radiation which will be readily absorbed by tuned sealing material 100. In such an embodiment, three separate electromagnetic radiation sources can be used to selectively, for example, heat tuned sealing material 100, backplate 502, or faceplate 504.

Figure 8:
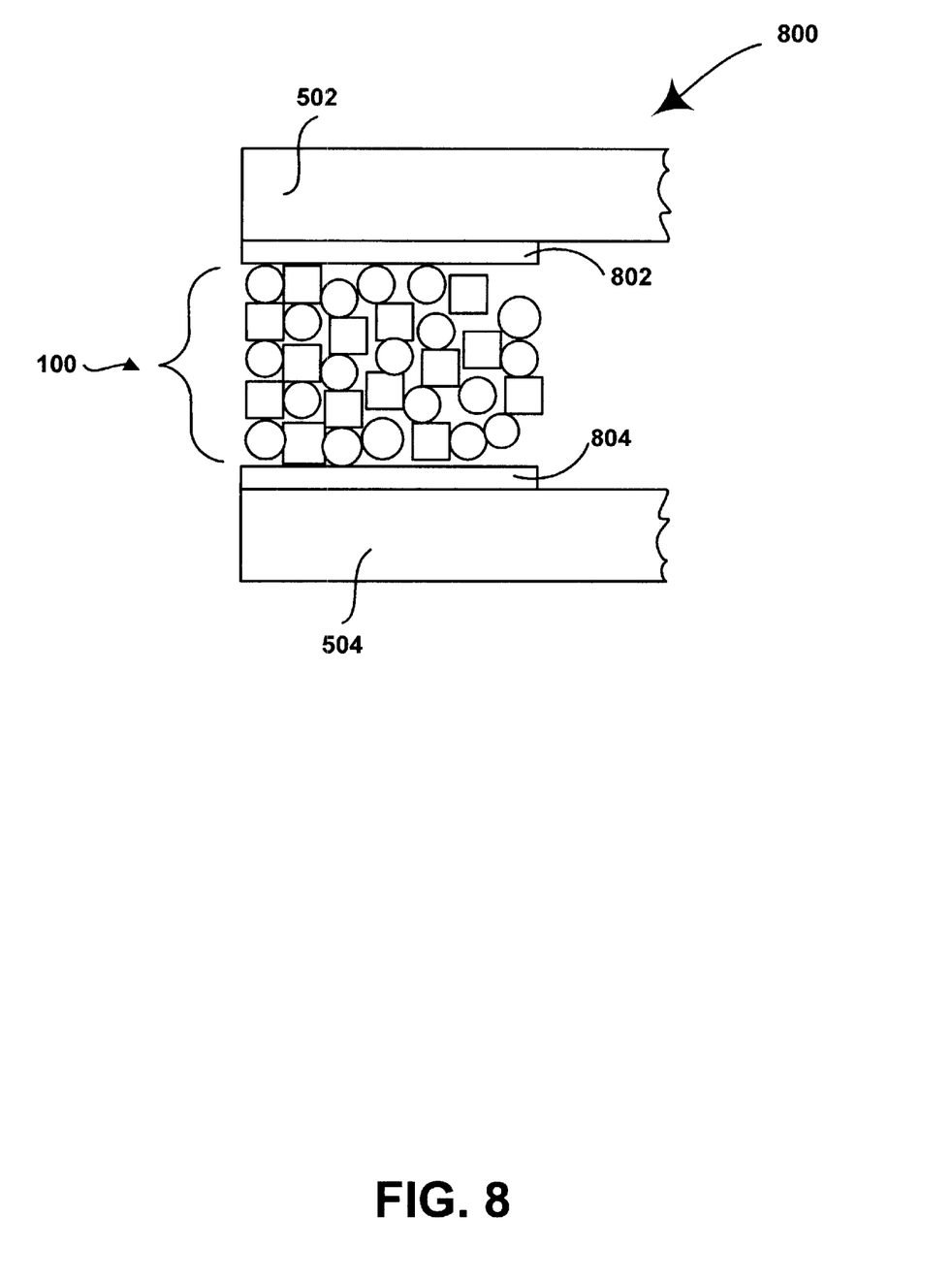
FIG. 8 is a side sectional view of a backplate and a faceplate having tuned sealing material disposed therebetween, wherein the backplate and the faceplate have an electromagnetic radiation absorbing thin film coupled thereto in accordance with one embodiment of the present claimed invention.

With reference now to FIG. 8, a side sectional view of a structure 800 is shown in accordance with another embodiment of the present invention. In the embodiment of FIG. 8, a backplate 502 and a faceplate 504 have tuned sealing material 100 disposed therebetween, and backplate 502 and faceplate 504 have an electromagnetic radiation absorbing thin film 802 and 804, respectively, coupled thereto. In one embodiment, prior to disposing tuned sealing material 100 between backplate 502 and faceplate 504, the present invention applies thin film 802 to backplate 502. Similarly, prior to disposing tuned sealing material 100 between backplate 502 and faceplate 504, the present embodiment applies thin film 804 to faceplate 504.

Referring still to FIG. 8, in the present embodiment, thin films 802 and 804 are adapted to absorb electromagnetic radiation of a selected frequency. The material used to stain thin films 802 and 804 are chosen so that they will enhance the absorption of electromagnetic radiation having a frequency different from the frequency of the electromagnetic radiation which will be readily absorbed by tuned sealing material 100. In such an embodiment, two separate electromagnetic radiation sources can be used to selectively, for example, heat either thin films 802 and 804 or tuned sealing material 100. In yet another embodiment, the material used to stain thin film 802 is chosen so that it will enhance the absorption of electromagnetic radiation having a frequency different from the frequency of the electromagnetic radiation which will be readily absorbed by thin film 804. Additionally, the material used to stain thin film 802 and the material used to stain thin film 804 is chosen so that it will enhance the absorption of electromagnetic radiation having a frequency different from the frequency of the electromagnetic radiation which will be readily absorbed by tuned sealing material 100. In such an embodiment, three separate electromagnetic radiation sources can be used to selectively, for example, heat tuned sealing material 100, thin film 802, or thin film 804. Additionally, although the present embodiment specifically recites having thin film coupled to each of backplate 502 and faceplate 504, the present invention is also well suited to an embodiment in which only one of backplate 502 and faceplate 504 have a thin film coupled thereto.

Hence, when subjected to electromagnetic radiation of the selected frequency, the thin films 802 and/or 804 will absorb the radiation and will, for example, be heated. In a manner similar to that described above, the present embodiment further expedites, for example, the heating and subsequent melting of tuned sealing material 100 by providing heated surfaces (i.e. thin film 802 and thin film 804) which are thermally coupled to tuned sealing material 100.

Thus, the present invention provides a method and apparatus for sealing a faceplate to a backplate wherein the method and apparatus does not require subjecting the sealing material to a laser beam for an extended period of time. The present invention further provides a method and apparatus for sealing a faceplate to a backplate wherein the method and apparatus does not require subjecting the sealing material to a high power laser beam. The present invention also provides a method and apparatus for sealing a faceplate to a backplate wherein the method and apparatus reduces the amount of heating of the faceplate and backplate.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A tuned sealing material for attaching a first flat panel display surface to a second flat panel display surface, said tuned sealing material comprising:
   a filler material; and
   a glass material mixed with said filler material, wherein said tuned sealing material is tuned to absorb electromagnetic radiation of a selected frequency with said tuned sealing material disposed between said first flat panel display surface and said second flat panel display surface;
   wherein said tuned sealing material is tuned by staining said filler material with an electromagnetic radiation absorbing material selected from the group consisting of copper oxides, ferrous oxides, chrome oxides, and ferrous chromates.

2. The tuned sealing material of claim 1 wherein said glass material is also tuned to absorb said electromagnetic radiation of said selected frequency.

3. The tuned sealing material of claim 1 wherein said tuned sealing material is also tuned by staining said glass material with an electromagnetic radiation absorbing material selected from the group consisting of copper oxides, ferrous oxides, chrome oxides, and ferrous chromates.

4. The tuned sealing material of claim 1 wherein said electromagnetic radiation to be absorbed by said tuning material is selected from the group consisting of visible light, laser light, microwave radiation, ultraviolet light, and infrared radiation.

5. The tuned sealing material of claim 1 wherein said first surface is a backplate of a field emission display device.

6. The tuned sealing material of claim 1 wherein said second surface is a faceplate of a field emission display device.

7. The tuned sealing material of claim 1 wherein said tuned sealing material further includes a plurality of filler materials.

8. The tuned sealing material of claim 7 wherein at least one of said filler materials is tuned to absorb said electromagnetic radiation of said selected frequency.

9. The tuned sealing material of claim 7 wherein more than one of said filler materials are tuned to absorb a plurality of frequencies of electromagnetic radiation.

10. The tuned sealing material of claim 1 wherein said tuned sealing material further includes a plurality of glass materials.

11. The tuned sealing material of claim 10 wherein at least one of said glass materials is tuned to absorb said electromagnetic radiation of said selected frequency.

12. The tuned sealing material of claim 10 wherein more than one of said glass materials are tuned to absorb a plurality of frequencies of electromagnetic radiation.

* * * * *